(12) United States Patent
Jensen

(10) Patent No.: US 7,992,504 B2
(45) Date of Patent: Aug. 9, 2011

(54) FARM IMPLEMENT WITH COUPLING DEVICE

(75) Inventor: Layton W. Jensen, Thurston, NE (US)

(73) Assignee: Thurston Manufacturing Company, Thurston, NE (US)

( * ) Notice: Subject to any disclaimer, the term of this patent is extended or adjusted under 35 U.S.C. 154(b) by 0 days.

(21) Appl. No.: 12/368,450

(22) Filed: Feb. 10, 2009

(65) Prior Publication Data
US 2010/0199898 A1 Aug. 12, 2010

(51) Int. Cl.
*A01B 15/14* (2006.01)
*A01B 23/04* (2006.01)
*A01B 39/24* (2006.01)
*A01C 15/00* (2006.01)
*A01C 23/00* (2006.01)

(52) U.S. Cl. ......... 111/123; 111/200; 111/925; 172/776

(58) Field of Classification Search .................. 172/776; 111/118–120, 123–127, 200, 925
See application file for complete search history.

(56) References Cited

U.S. PATENT DOCUMENTS

| 3,834,330 | A | * | 9/1974 | Wallace | 111/126 |
| 3,889,979 | A | * | 6/1975 | Schmiesing | 172/272 |
| 3,894,498 | A | * | 7/1975 | van den Berg | 111/132 |
| 6,070,344 | A | * | 6/2000 | Roberts | 37/302 |
| 6,584,919 | B2 | * | 7/2003 | McQuinn | 111/118 |
| 7,096,802 | B1 | * | 8/2006 | Kiest | 111/119 |
| 2009/0014982 | A1 | * | 1/2009 | Wulff | 280/477 |

FOREIGN PATENT DOCUMENTS

FR 2640568 A1 * 6/1990

OTHER PUBLICATIONS

BLU-JET AutoLok Nurse Tank Hitch, Feb. 4, 2009, 1 page.
BLU-JET AT7000™ 25R30 All Terrain Jet Stream Injection Applicator, Copyright 2008, 2 pages.
Holland Fifth Wheels Product Catalog and Selection Guide, Feb. 3, 2008, 74 pages.

* cited by examiner

*Primary Examiner* — Christopher J. Novosad
(74) *Attorney, Agent, or Firm* — Merchant & Gould P.C.

(57) ABSTRACT

A farm implement includes a chassis, a wheeled section, a tool section, and a fifth wheel coupling device for receiving and coupling with a complimentary coupling pin on a semi-trailer. A fifth wheel coupling system includes a fifth wheel coupling plate having a slot designed to receive a coupling pin of a semi-trailer, a latching mechanism designed to latch onto the coupling pin of the semi-trailer, and a coupling device interface designed to connect the fifth wheel coupling plate and latching device to a farm implement. A method of connecting a semi-trailer to a farm implement having a fifth wheel coupling device includes aligning and connecting a coupling pin of the semi-trailer with a coupling device of a farm implement. A farm implement includes a coupling device designed to connect with a complimentary coupling device of a trailer having a storage tank with a capacity greater than 1,000 gallons.

18 Claims, 14 Drawing Sheets

FARM IMPLEMENT WITH COUPLING DEVICE

TECHNICAL FIELD

The present disclosure relates to farm implements, and more particularly to farm implements configured to tow a separate trailer.

BACKGROUND

As farm sizes grow and agricultural competitiveness increases, operational efficiency of the work done in fields becomes increasingly important. In some situations, larger farm implements covering more acres in every hour per operator are used to increase efficiency. Some farm implements are used to apply fertilizers, chemicals, seed, and other substances to soil and crops in fields. Various farm implements are used for surface application or subsurface injection of these substances.

SUMMARY

In general terms, this disclosure is directed to a farm implement with a coupling device configured to tow semi-trailers or full-trailers.

One aspect is a farm implement. The farm implement includes a chassis, a wheeled section coupled to the chassis and arranged and configured to support the chassis with respect to the ground, a tool section coupled to the chassis and arranged and configured to introduce a substance to the ground, and a fifth wheel coupling device arranged and configured to connect with a coupling pin of a semi-trailer, wherein the tool section is arranged and configured to receive the substance from the semi-trailer.

Another aspect is a farm implement coupling system. The farm implement coupling system includes a fifth wheel coupling plate having a slot arranged and configured to receive a coupling pin of a semi-trailer, a latching mechanism disposed below the fifth wheel coupling plate and configured to receive and couple with the coupling pin of the semi-trailer, and a coupling device interface arranged and configured to couple the fifth wheel coupling plate and the latching mechanism to a farm implement.

A further aspect is a method of connecting a semi-trailer to a farm implement having a fifth wheel coupling device. The method includes aligning a coupling pin of the semi-trailer with a coupling device of a farm implement, the farm implement including a chassis, a wheeled section coupled to the chassis, a tool section coupled to the chassis, and the fifth wheel coupling device; and connecting the fifth wheel coupling device of the farm implement with the coupling pin of the semi trailer.

Yet another aspect is a farm implement. The farm implement includes a chassis, a wheeled section coupled to the chassis and arranged and configured to support the chassis with respect to a ground, a tool section coupled to the chassis and configured to introduce a substance to the ground, and a coupling device arranged and configured to connect with a complimentary coupling device of a trailer having a storage tank with a capacity of greater than 1,000 gallons, wherein the tool section is arranged and configured to receive the substance from the trailer.

DETAILED DESCRIPTION

Figure 1:
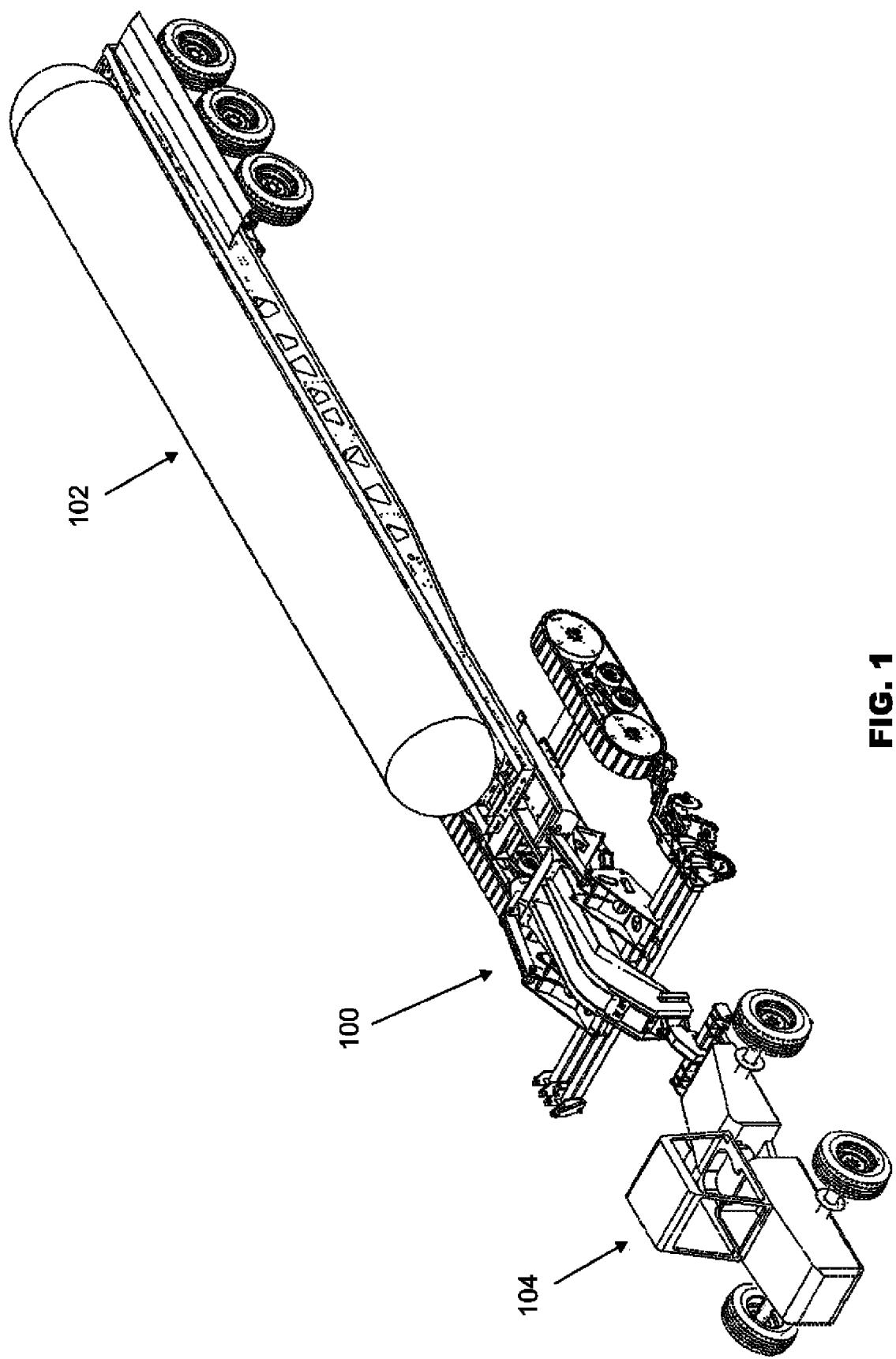
FIG. 1 is a perspective view of an exemplary farm implement connected to a semi-trailer by a fifth wheel coupling device near a first end and connected to a towing vehicle near a second end according to the present disclosure.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

One difficulty in surface application and subsurface injection of substances such as fertilizers, chemicals, seed, and other substances is the storage and transport of the substances to be applied while in the field performing the application or injection. The substance for application or injection is typically liquid, dry, aqueous, or gaseous. Often, large quantities of substances are required to cover an entire field. Some farm implements are physically limited in their ability to carry a suitable supply of substances. This has become increasingly true as farm implements have become wider, including more points of application or injection, and thus using more substance per hour.

A variety of methods and machines are currently used to store and transport the substances to be applied during surface applications and subsurface injections, none of which are ideal solutions. Some farm implements have space for storage of substance containers and tanks on the implement itself. One disadvantage with these options is that they typically must be refilled or swapped out with full tanks often. This can be a time consuming process, particularly if the operator is required to travel back to a central location to refill or exchange tanks and containers. This is becoming more and more relevant as farm sizes continue to grow and the distance back to the central location increases. Even if the operator is not required to travel far, transference of substance from an external tank or container into the implement's onboard tank or container often requires the implement not be used during transference and can also be quite time consuming. Thus, the ability to couple a semi-trailer having greater substance capacity to a farm implement is desirable.

FIG. 1 illustrates an example farm implement 100 coupled with a semi-trailer 102 and a tractor 104 according to the present disclosure. In some possible examples, the farm implement 100 operates to apply a substance onto crops or onto the soil surface or to inject the substance into the soil. In examples where the substance is applied to the crops or soil surface, the substance is applied through spray nozzles, tubes, or other suitable devices. In examples where the substance is injected into the soil, the substance is injected through injection devices, tubes, or other suitable devices. Some possible examples of the farm implement 100 include devices designed to prepare the soil for application or injection. These devices will be discussed in further detail with regards to FIGS. 11-13. The semi-trailer 102 stores the substance being used for application or injection. There is a conveyance hose connected between the semi-trailer 102 and the farm implement 100. The conveyance hose supplies the farm implement 100 with the substance in the semi-trailer 102. Because of the large substance capacity of some embodiments of the semi-trailer 102, less time is spent refilling substance or unhitching and hitching smaller capacity trailers.

In possible embodiments, the farm implement 100 is coupled with the semi-trailer 102 by a fifth wheel coupling system including a fifth wheel coupling device positioned near a rear end of the farm implement 100 and a coupling pin connected to the semi-trailer 102. Example embodiments of the semi-trailer 102 include a tanker semi-trailer, a flatbed semi-trailer, a dry bulk semi-trailer, a box semi-trailer, or a refrigerated semi-trailer. In some possible examples, other types of coupling devices are used, such as a pintle type coupling system for connection to a full-trailer. Typically, a full-trailer includes a semi-trailer 102 with an added dolly or turntable set of axles as a front support of the semi-trailer. The full-trailer is typically connected to the farm implement 100 or a truck, tractor, trailer, or other vehicle with the pintle type coupling system which includes a pintle hook disposed on the farm implement 100 and a lunette ring disposed on the full-trailer, as described in detail with regard to FIG. 14. Example embodiments of the full-trailer include a tanker full-trailer, a flatbed full-trailer, a dry bulk full-trailer, a box full-trailer, or a refrigerated full-trailer. Example embodiments of farm implement 100 include both the fifth wheel coupling system and the pintle type coupling system. The fifth wheel coupling system and the pintle type coupling system are discussed in detail below. Other examples implement different coupling systems and connect to other types of trailers.

The farm implement 100 is connected to the tractor 104 with a second coupling device positioned near a front end of the farm implement 100, opposite the rear end. In some examples, the farm implement 100 connects to the tractor 104 by any suitable coupling system. In other examples, the farm implement 100 includes a motor and the tractor 104 is unnecessary. In other embodiments, the farm implement 100, the semi-trailer 102, and the tractor 104 are arranged in other configurations and orderings. The second coupling system is discussed in detail below.

Figure 2:
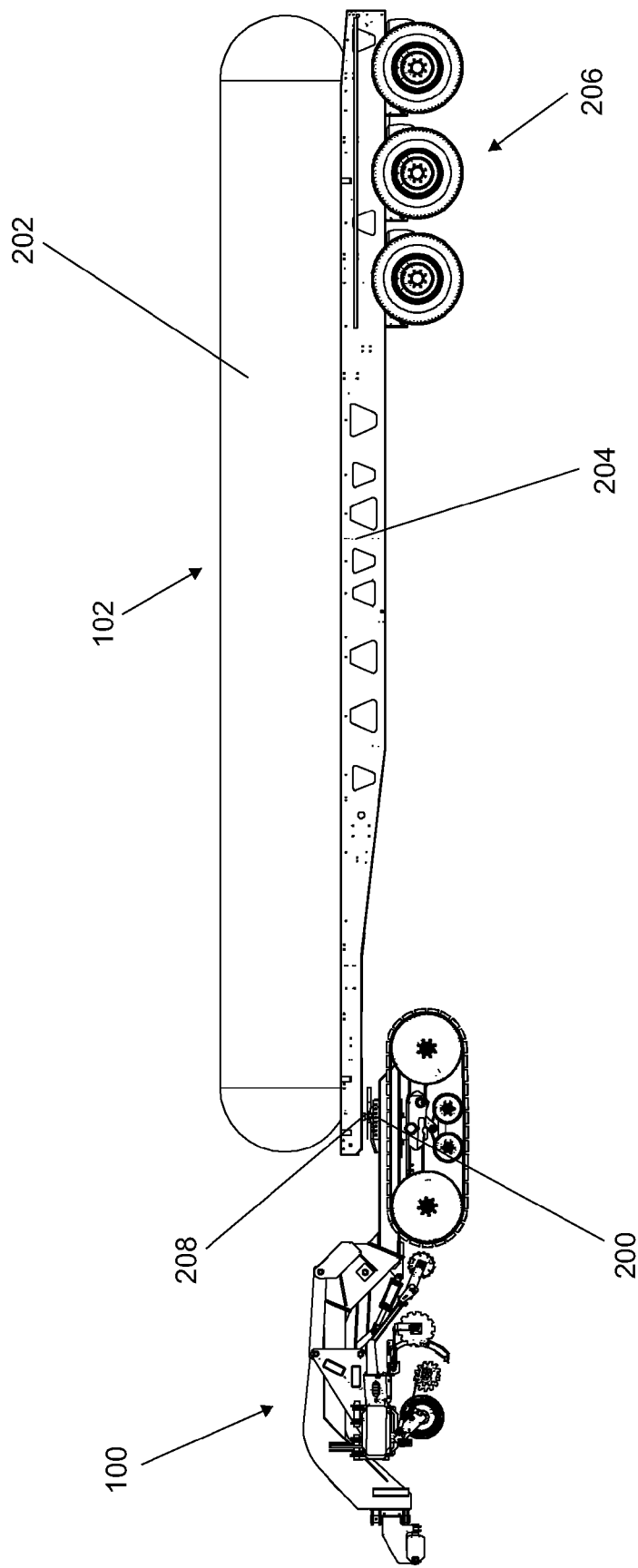
FIG. 2 is a side view of the farm implement shown in FIG. 1 while coupled to the semi-trailer of FIG. 1 via the fifth wheel coupling device near the first end of the semi-trailer.
Figure 3:
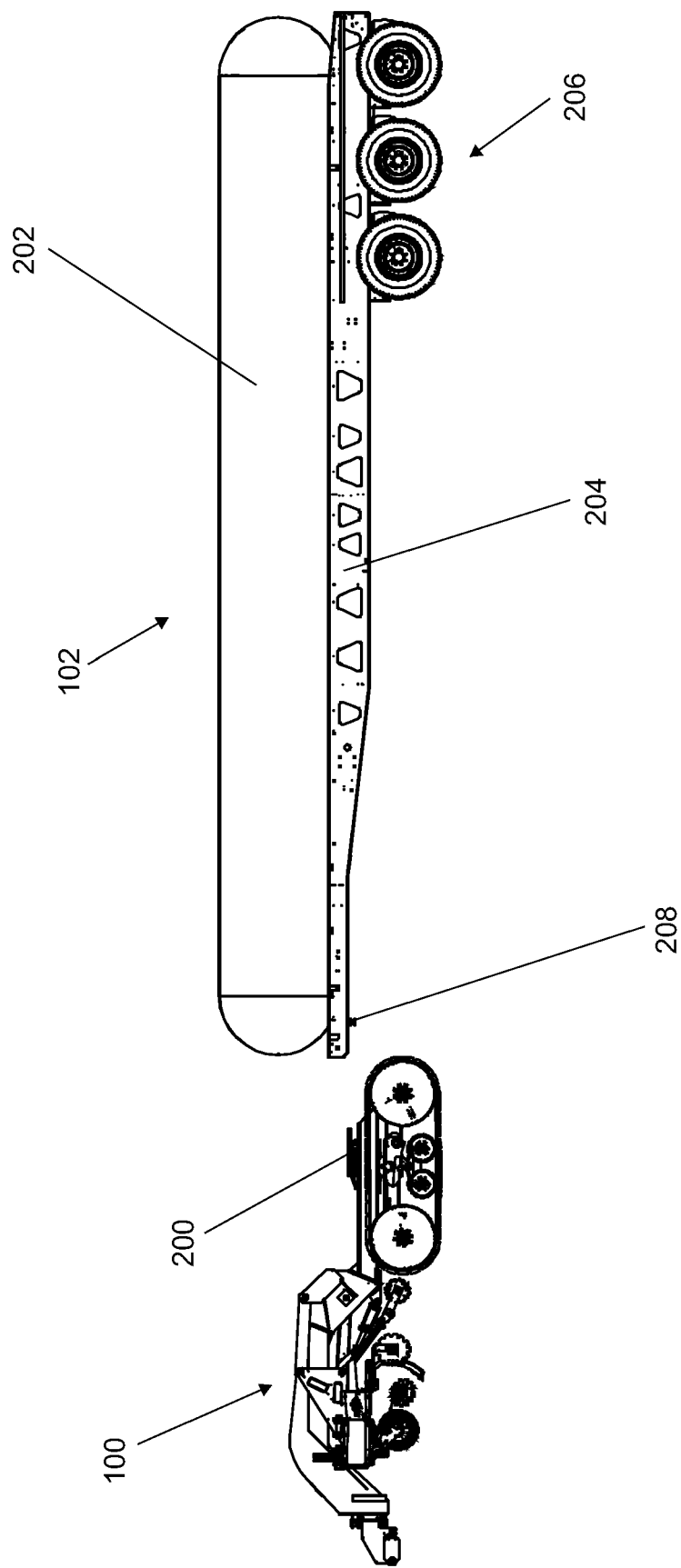
FIG. 3 is a side view of the farm implement shown in FIG. 1 while uncoupled from the semi-trailer of FIG. 1.

FIGS. 2-3 are side views of the example farm implement 100 and the semi-trailer 102. FIG. 2 is a side view of the farm implement 100 while coupled with the semi-trailer 102 via a coupling device. FIG. 3 is a side view of the farm implement 100 while uncoupled from the semi-trailer 102.

In some embodiments, the farm implement 100 includes a fifth wheel coupling device 200 positioned near the rear end of farm implement 100. The fifth wheel coupling device 200 is designed to be complimentary to coupling devices found on semi-trailers, which will be discussed below. In some embodiments having the fifth wheel coupling device 200, a semi-trailer 102 is coupled to the farm implement 100. As noted above, some embodiments include a pintle type coupling device for semi-trailers having a dolly or turntable set of axles as a front support of the semi-trailer. In some embodiments having a pintle type coupling device, a full-trailer having a turntable with its own undercarriage of suspension, axles, and wheels is coupled to farm implement 100. In some embodiments having a pintle type coupling device, the full-trailer has a complimentary pintle type coupling device configured to couple with the pintle type coupling device of the farm implement 100.

Some embodiments include both the fifth wheel coupling device 200 and a pintle type coupling device, allowing a variety of semi-trailers to be coupled with the farm implement 100. Other embodiments of the farm implement 100 include other suitable coupling devices, including other types of coupling pins and coupling plates. The fifth wheel coupling device 200 is discussed in further detail with regard to FIGS. 4-10, along with a discussion of how the fifth wheel coupling device 200 interfaces with the farm implement 100. The remainder of the farm implement 100 will be discussed in further detail with regards to FIGS. 11-13.

In some embodiments, the semi-trailer 102 is a semi-trailer arranged and configured to be coupled with a traditional truck-tractor. This allows the semi-trailer 102 to be delivered to a field, for example, by such a truck-tractor if desired. As discussed herein, the semi-trailer 102 is also configured to connect with the farm implement 100. The semi-trailer 102 typically includes a storage tank 202 disposed on a chassis 204. In other embodiments, other types of substance containers are disposed on the chassis 204. The storage tank 202 or other substance container typically contains plant growth enhancing chemicals such as herbicides, insecticides, commercial fertilizer, lime, animal or human waste products or any product related to the benefit of sustaining plant life or any substance needing a disposal method whereby the application onto or injection into soil is environmentally compatible with that substance as a means of disposal.

In other embodiments, fertilizers, other chemicals, seed, and other substances are carried in the storage tank 202 or other substance container disposed on the chassis 204. The semi-trailer 102 also typically includes a plurality of wheels 206 attached below the chassis 204 near a rear end of the chassis 204. In some embodiments, the semi-trailer 102 has from about 2 to about 6 wheels 206 attached to one or more axles (e.g. 1-3 axles). In some embodiments, the wheels 206 are doubled up next to each other to help distribute weight, such that the semi-trailer 102 has between about 4 and about 12 wheels 206 attached to the one or more axles. In other embodiments, the semi-trailer 102 has greater or fewer wheels 206 and axles. In another possible embodiment, the wheels 206 of semi-trailer 102 are surrounded by continuous tracks. Some other possible embodiments include other devices facilitating movement of the semi-trailer 102.

The semi-trailer 102 also includes a coupling pin 208 coupled to the chassis 204, typically near a front end of the chassis 204. The coupling pin 208 facilitates coupling with a truck-tractor or the farm implement 100. The coupling pin 208 is a coupling device configured to mate with a complimentary coupling device on a truck-tractor and the fifth wheel coupling device 200 of the farm implement 100. In some embodiments, the coupling pin 208 is a king pin.

The semi-trailer 102, and others like it, can be coupled and uncoupled from the fifth wheel coupling device 200 of the farm implement 100. FIG. 2 shows the fifth wheel coupling device 200 of the farm implement 100 coupled with the coupling pin 208 of the semi-trailer 102. In example embodiments, the coupling pin 208 of the semi-trailer 102 slides into a slot positioned in the fifth wheel coupling device 200 and is secured in place by a latching mechanism of the fifth wheel coupling device 200. In some examples, the fifth wheel coupling device 200 is arranged and configured to tow a semi-trailer 102 with a gross weight of over about 18,000 kilograms (about 40,000 pounds). In other examples, the fifth wheel coupling device 200 is arranged and configured to tow a semi-trailer 102 with a greater or lesser gross weight.

FIG. 3 shows an example of the fifth wheel coupling device 200 of the farm implement 100 uncoupled from the coupling pin 208 of the semi-trailer 102. In example embodiments, the coupling pin 208 of the semi-trailer 102 is removed from the fifth wheel coupling device 200 of the farm implement 100. Specifically, in some embodiments a release lever is actuated on the fifth wheel coupling device 200 to open the latching mechanism of the fifth wheel coupling device 200, and the coupling pin 208 of semi-trailer 102 is removed from the fifth wheel coupling device 200 of farm implement 100.

In some embodiments, the fifth wheel coupling device 200 includes a hydraulic or pneumatic cylinder configured to aid in ejection of the coupling pin 208 of the semi-trailer 102 from the fifth wheel coupling device 200 of the farm implement 100. In some embodiments, the hydraulic cylinder is actuated after the latching mechanism of the fifth wheel coupling device 200 is opened. As the hydraulic cylinder is actuated, it moves and pushes the coupling pin 208 up and out of the slot positioned in the fifth wheel coupling device 200, thus ejecting the coupling pin 208 of the semi-trailer 102 from the fifth wheel coupling device 200. Some possible examples of semi-trailer 102 also include adjustable legs 210 or other supports that are extended or rotated down to support the front side of the semi-trailer 102 while detached from a truck-tractor or the farm implement 100.

Figure 4:
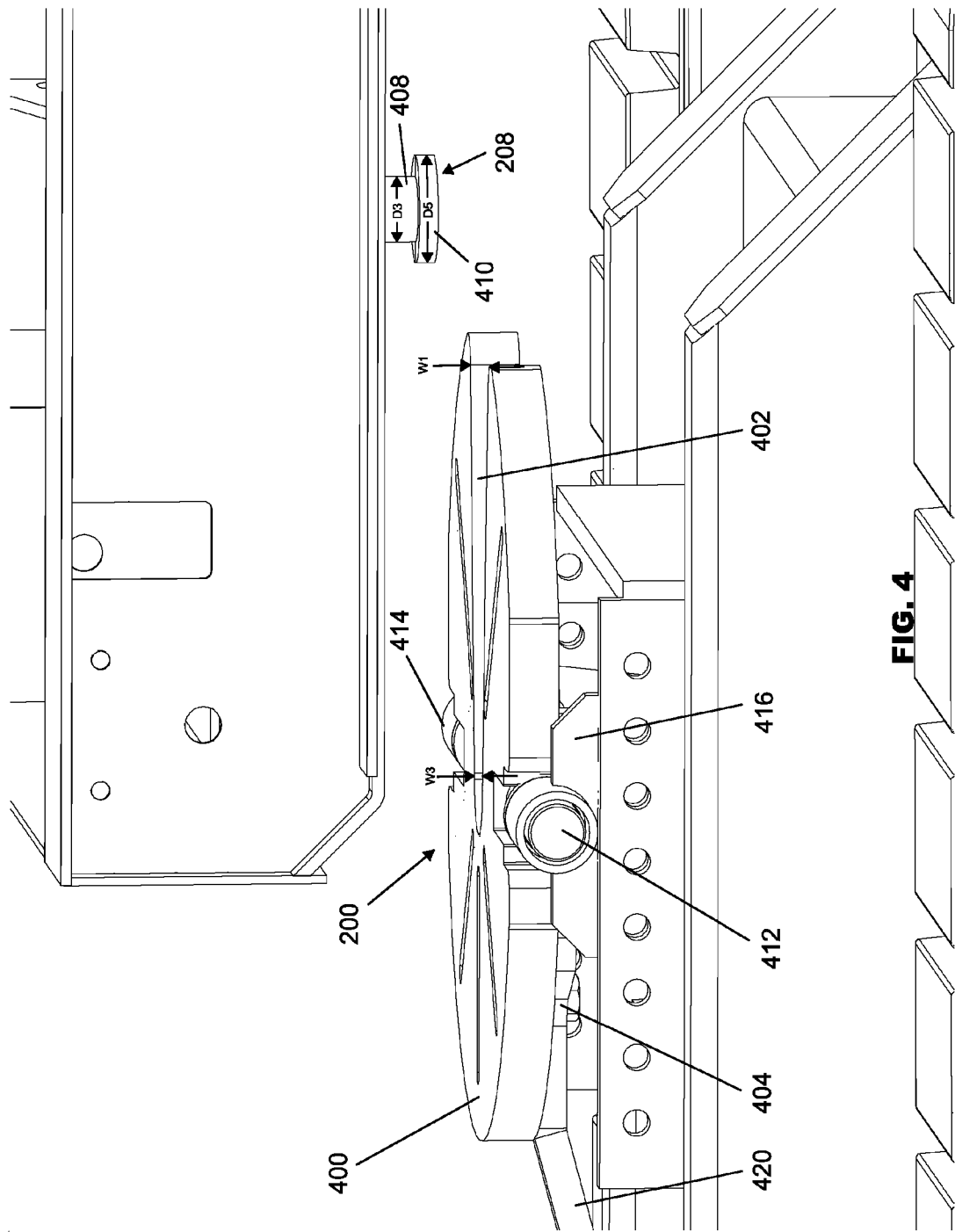
FIG. 4 is a close up side perspective view of the fifth wheel coupling device of the farm implement shown in FIGS. 1-3 with the coupling pin of the semi-trailer shown in FIG. 1-3 lined up with a slot disposed in the fifth wheel plate of FIG. 1-3.
Figure 5:
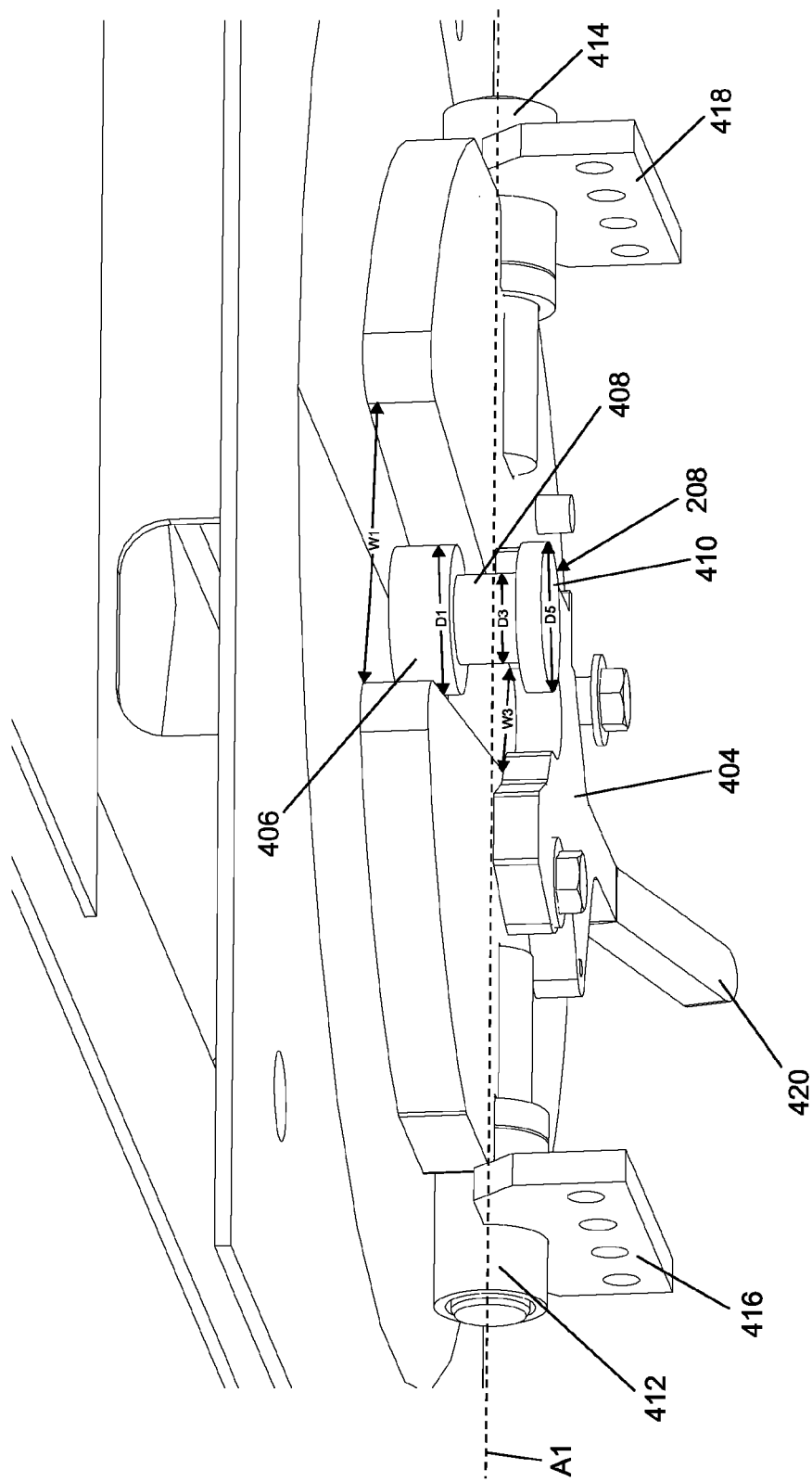
FIG. 5 is a close up bottom perspective view of portions of the fifth wheel coupling device shown in FIG. 4 as the coupling pin shown in FIG. 4 is inserted into the slot of FIG. 4.
Figure 6:
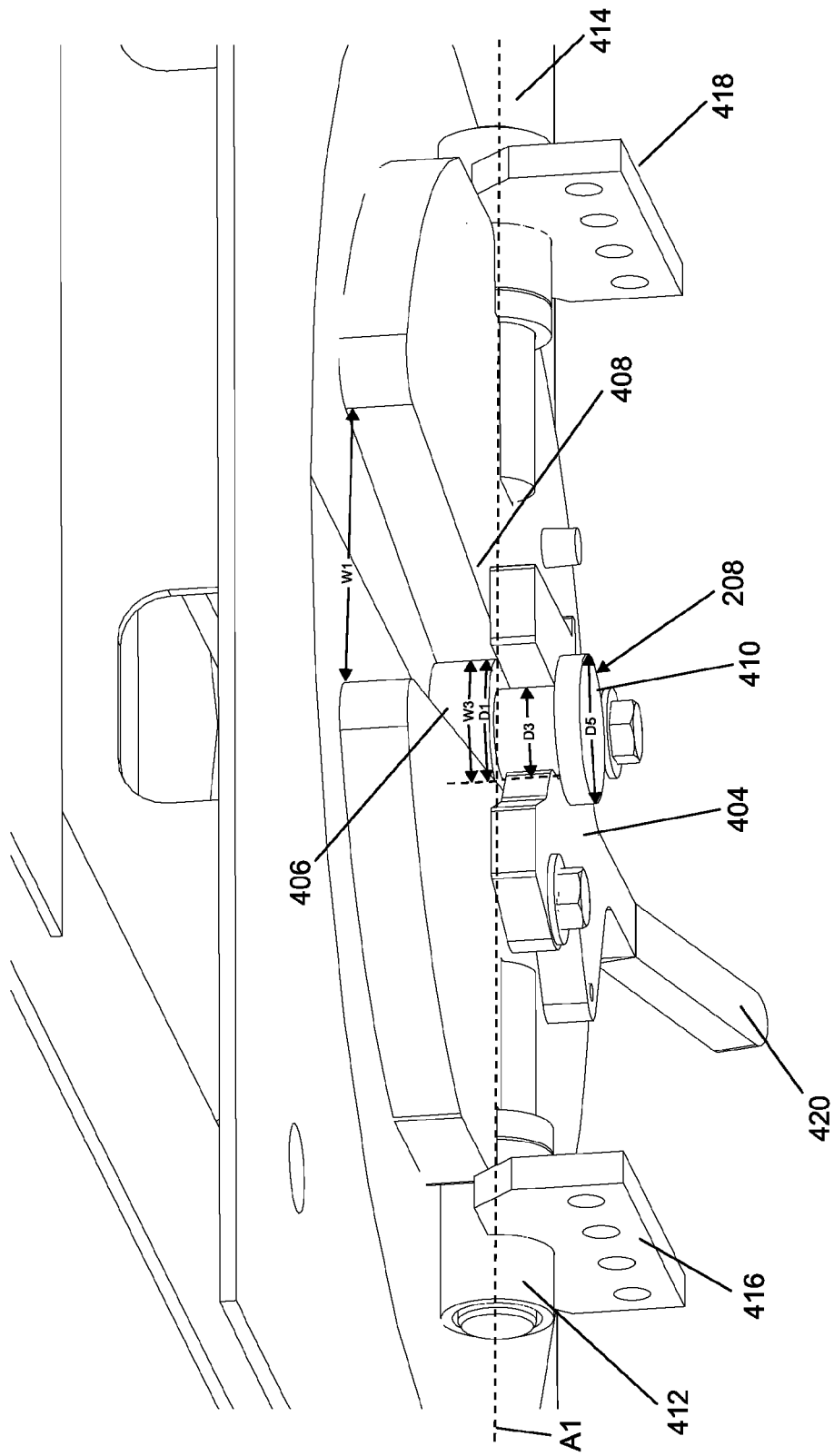
FIG. 6 is a close up bottom perspective view of portions of the fifth wheel coupling device shown in FIG. 4 as the coupling pin shown in FIG. 4 is received by a latching mechanism disposed at one end of the slot of FIG. 4 near the center of the fifth wheel coupling device shown in FIG. 4.

FIGS. 4-6 show the coupling of the coupling pin 208 of the semi-trailer 102 to the example fifth wheel coupling device 200 of the farm implement 100 in greater detail. The fifth wheel coupling device 200 includes a number of components, including a fifth wheel skid plate 400, a slot 402, and a latching mechanism 404. In some embodiments, the fifth wheel skid plate 400 includes a generally flat top surface. In some embodiments, the fifth wheel skid plate 400 includes a slot 402 into which a coupling pin can be inserted. The slot 402 tapers from being wider near the edge of the fifth wheel skid plate 400 to being narrow near the center of the fifth wheel skid plate 400. In some embodiments, the slot 402 tapers from having a width of between about 7.6 centimeters (about 3 inches) and about 25 centimeters (about 10 inches) at its widest end to having a width of between about 2.5 centimeters (about 1 inch) and about 13 centimeters (about 5 inches) at its narrowest end.

FIG. 4 shows the coupling pin 208 of semi-trailer 102 lined up with the slot 402 which is disposed in the fifth wheel skid plate 400 of the fifth wheel coupling device 200 of farm implement 100. FIG. 5 shows a bottom view of portions of the fifth wheel coupling device 200 as the coupling pin 208 is inserted into the slot 402. FIG. 6 shows a bottom view of portions of the fifth wheel coupling device 200 as the coupling pin 208 is received by the latching mechanism 404 disposed near the center of the fifth wheel skid plate 400 and at the narrow end of the slot 402. Portions of the farm implement 100, including the fifth wheel coupling device 200, are not shown in FIGS. 4-6, so that the parts discussed can be seen more clearly.

In some embodiments, the coupling pin 208 is cylindrical in shape. The coupling pin 208 changes in diameter from having a larger diameter D1 in a base section 406 near its connection with the chassis 204 of the semi-trailer 102 to having a smaller diameter D3 in a narrow middle section 408 and then having a larger diameter D5 again at its tip section 410. D1 and D5 are typically between about 2.5 centimeters (about 1 inch) and about 15 centimeters (about 6 inches), and preferably between about 5.1 centimeters (about 2 inches) and about 13 centimeters (about 5 inches). D3 is typically between about 1.3 centimeters (about 0.5 inches) and about 13 centimeters (about 5 inches), and preferably between about 2.5 centimeters (about 1 inch) and about 10 centimeters (about 4 inches). In other embodiments, D1, D3, and D5 are larger or smaller. In some embodiments, the coupling pin 208 is made of steel or another metal. In other embodiments, the coupling pin 208 is made of other strong and durable materials.

In some possible embodiments, the latching mechanism 404 of the fifth wheel coupling device 200 is configured to grasp around the narrow middle section 408 of the coupling pin 208, securing it in place, while allowing the trailer to pivot around the fifth wheel coupling device 200, facilitating improved turning ability of the combination of the semi-trailer 102 connected to the farm implement 100. The latching mechanism 404 typically includes one or more jaws that clamp around the narrow middle section 408 of the coupling pin 208.

In some embodiments, the fifth wheel coupling device 200 also includes a pivoting mechanism 412 disposed on a first side of fifth wheel skid plate 400 and a pivoting mechanism 414 disposed on a second side of fifth wheel skid plate 400 opposite the first side. The pivoting mechanism 412 and the pivoting mechanism 414 are typically aligned about an axis A1, enabling the fifth wheel skid plate 400 to pivot forward and backward to accommodate differences in the height of farm implement 100 and semi-trailer 102 based on the terrain being traveled across or differences in height between the farm implement 100 and the semi-trailer 102. In some embodiments, the pivoting mechanism 412 is coupled with a fifth wheel anchor plate 416 and the pivoting mechanism 414 is coupled with a fifth wheel anchor plate 418. The fifth wheel anchor plate 416 and the fifth wheel anchor plate 418 are then coupled to the farm implement as described with regards to FIGS. 7-10. In other embodiments, other pivoting mechanisms are included, allowing the fifth wheel skid plate 400 to pivot from side to side and in other directions and orientations. Other embodiments do not include any pivoting mechanisms and the fifth wheel skid plate 400 is rigidly coupled with the fifth wheel anchor plate 416 and the fifth wheel anchor plate 418.

A variety of alternate embodiments are possible, some of which include the following features: a fifth wheel skid plate 400 elevated by other devices and mechanisms, height adjustability of the fifth wheel skid plate 400, slidably coupling the fifth wheel skid plate 400 to the chassis 702 so it can move from one position to another. Typically, the slidably coupling of the fifth wheel skid plate 400 helps distribute weight over the farm implement 100, facilitates coupling of semi-trailers with various coupling pin sizes and configurations, or facilitates better maneuverability and a smaller turning radius.

In some embodiments, the latching mechanism 404 of the fifth wheel coupling device 200 is opened and closed by moving latching mechanism handle 420. In one example, the latching mechanism handle 420 is moved in a first direction to close the latching mechanism 404 around the narrow middle section 408 of the coupling pin 208. The latching mechanism handle 420 is moved in a second direction, opposite the first direction, to open the latching mechanism 404 from around the narrow middle section 408 of the coupling pin 208. In other examples, the latching mechanism 404 is normally in a closed position, unless opened with latching mechanism handle 420 for insertion or removal of the coupling pin 208. In other examples, the latching mechanism 404 is normally in a closed position, until the coupling pin 208 is inserted. For example, insertion of the coupling pin 208 causes the latching mechanism 404 to open and automatically close around the coupling pin 208. In these embodiments, the removal of the coupling pin requires the latching mechanism 404 to be opened with the latching mechanism handle 420 before the coupling pin can be removed. In other embodiments, other mechanisms and safety features are included to ensure the latching mechanism does not accidentally open at an unintended time, such as while the farm implement 100 is moving and towing the semi-trailer 102.

Figure 7:
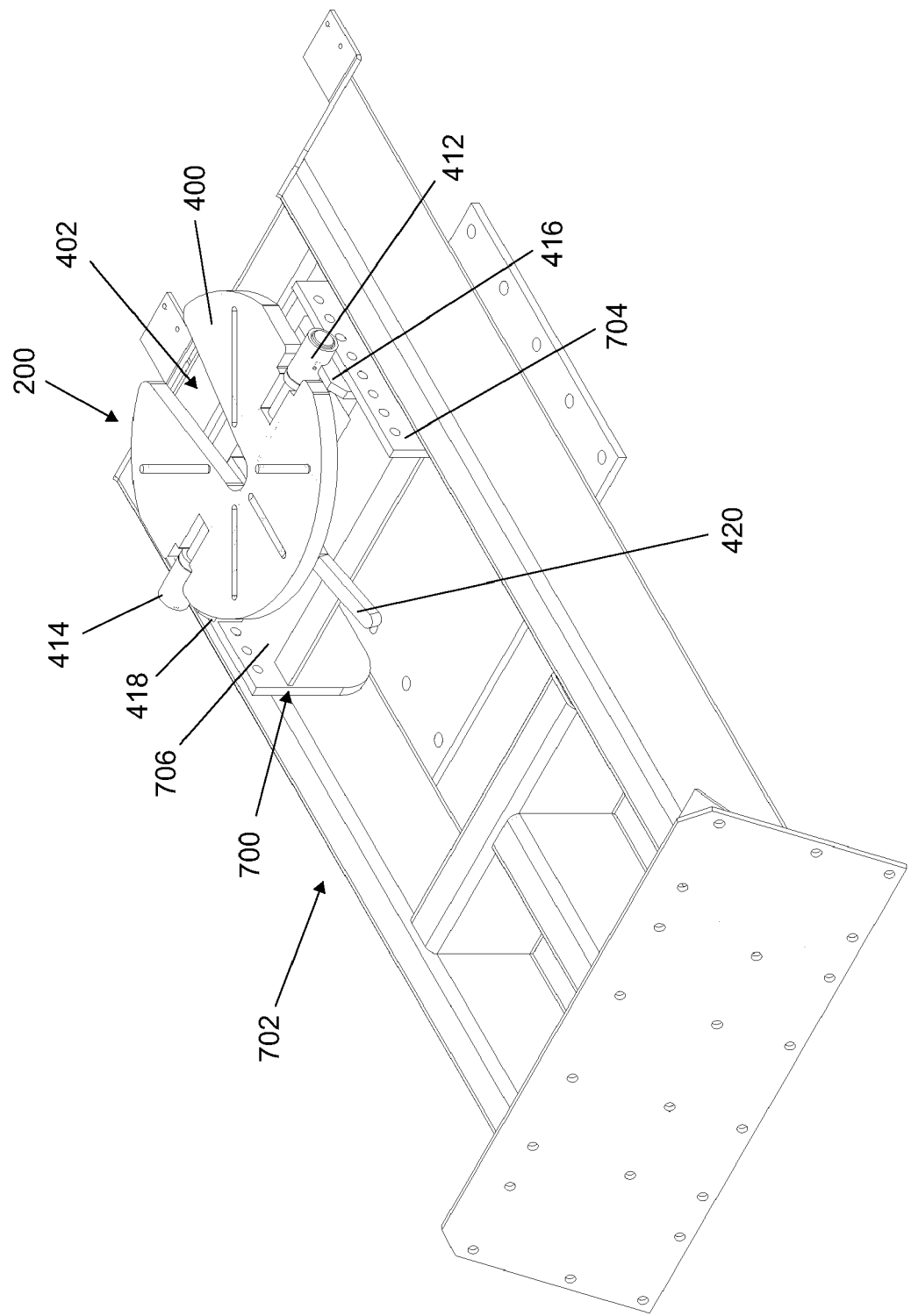
FIG. 7 is a perspective view of an exemplary interface apparatus while interfacing between the fifth wheel coupling device and a frame of the farm implement shown in FIG. 1.

FIG. 7 is a perspective view of an example coupling device interface 700 that interfaces between the fifth wheel coupling device 200 shown in FIGS. 4-6 and a chassis 702 of the farm implement 100. In some embodiments, the chassis 702 is made of iron, steel, aluminum, titanium, or another strong and durable material. In other examples, the chassis 702 is constructed of other suitable materials, such as wood or a composite. As noted above, the fifth wheel coupling device 200 typically includes the fifth wheel skid plate 400. The fifth wheel skid plate 400 interfaces with the coupling pin 208 of the semi-trailer 102. Some embodiments also include the pivoting mechanism 412 and the pivoting mechanism 414 discussed above, such that the fifth wheel skid plate 400 is coupled with the pivoting mechanism 412 on a first side and with the pivoting mechanism 414 on a second side. The pivoting mechanism 412 is typically coupled with the fifth wheel anchor plate 416 and the pivoting mechanism 414 is typically coupled with the fifth wheel anchor plate 418.

In some embodiments, the coupling device interface 700 includes a mounting plate 704 and a mounting plate 706. The mounting plate 704 is typically mounted on a first side of the chassis 702 and the mounting plate 706 is typically mounted on a second side of the chassis 702, opposite the first side. Typically, the mounting plate 704 and the mounting plate 706 are either welded to or bolted to the chassis 702. In other examples, the mounting plate 704 and the mounting plate 706 are coupled with the chassis 702 in other ways.

The fifth wheel anchor plate 416 is typically welded or bolted to the mounting plate 704 and the fifth wheel anchor plate 418 is typically welded or bolted to the mounting plate 706. In other possible examples, the fifth wheel skid plate 400 is coupled to the mounting plate 704 and the mounting plate 706 in other ways or the fifth wheel skid plate 400 is coupled directly with the chassis 702. In other embodiments, greater or fewer components are used to couple the fifth wheel skid plate 400 with the chassis 702. In alternative embodiments, the fifth wheel coupling device 200 is mounted directly to the chassis with a fastener, such as vertical mounting bolts.

Embodiments typically include the latching mechanism 404 and the latching mechanism handle 420 as described above. The latching mechanism handle 420 typically pivots left and right. As described above, actuation of the latching mechanism handle 420 in one direction typically closes the latching mechanism 404 of fifth wheel coupling device 200 around the coupling pin 208 of semi-trailer 102.

Figure 8:
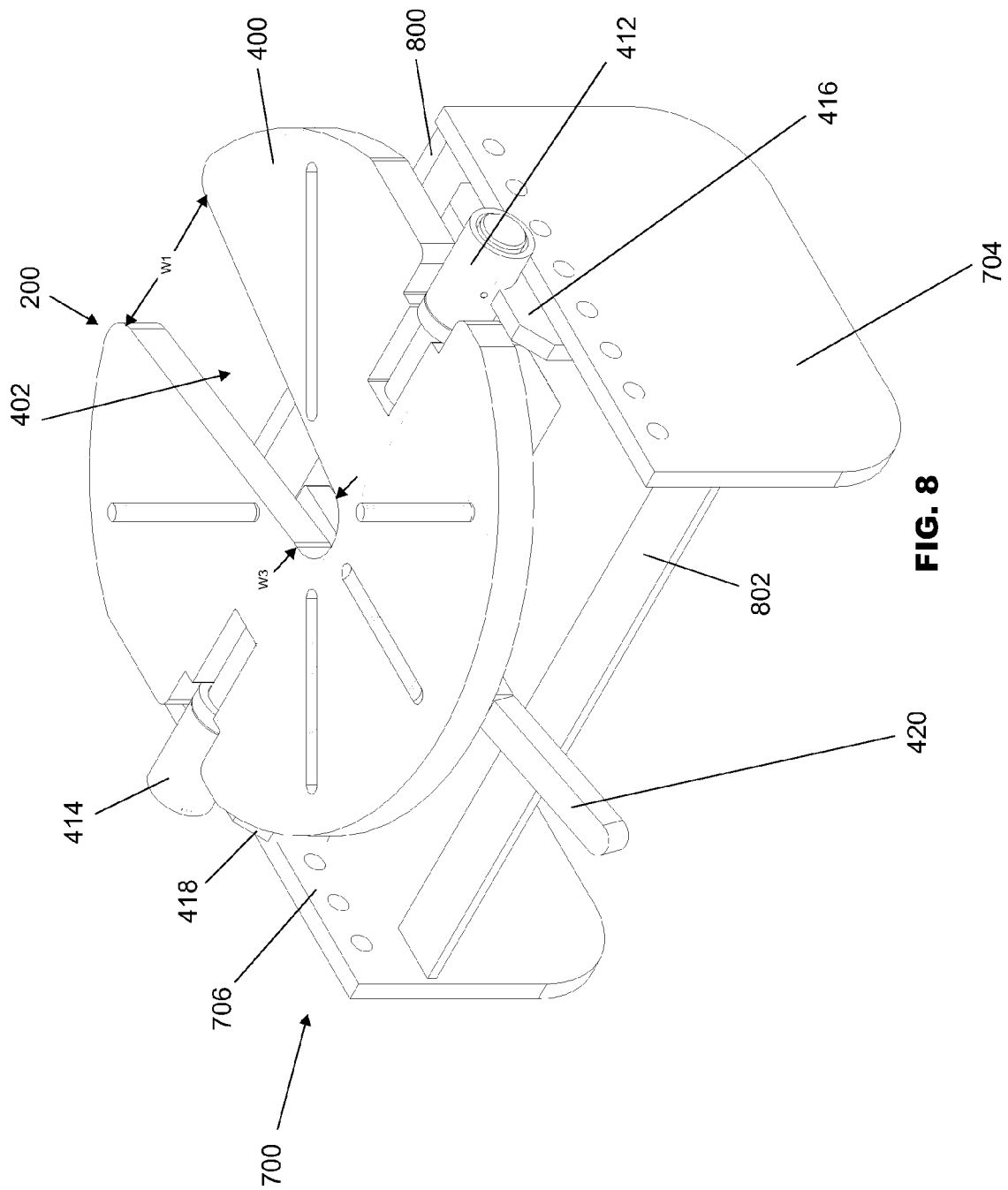
FIG. 8 is a perspective view of the exemplary interface apparatus shown in FIG. 7 interfacing with the fifth wheel coupling device shown in FIG. 4, while detached from the frame of the farm implement shown in FIG. 7.
Figure 9:
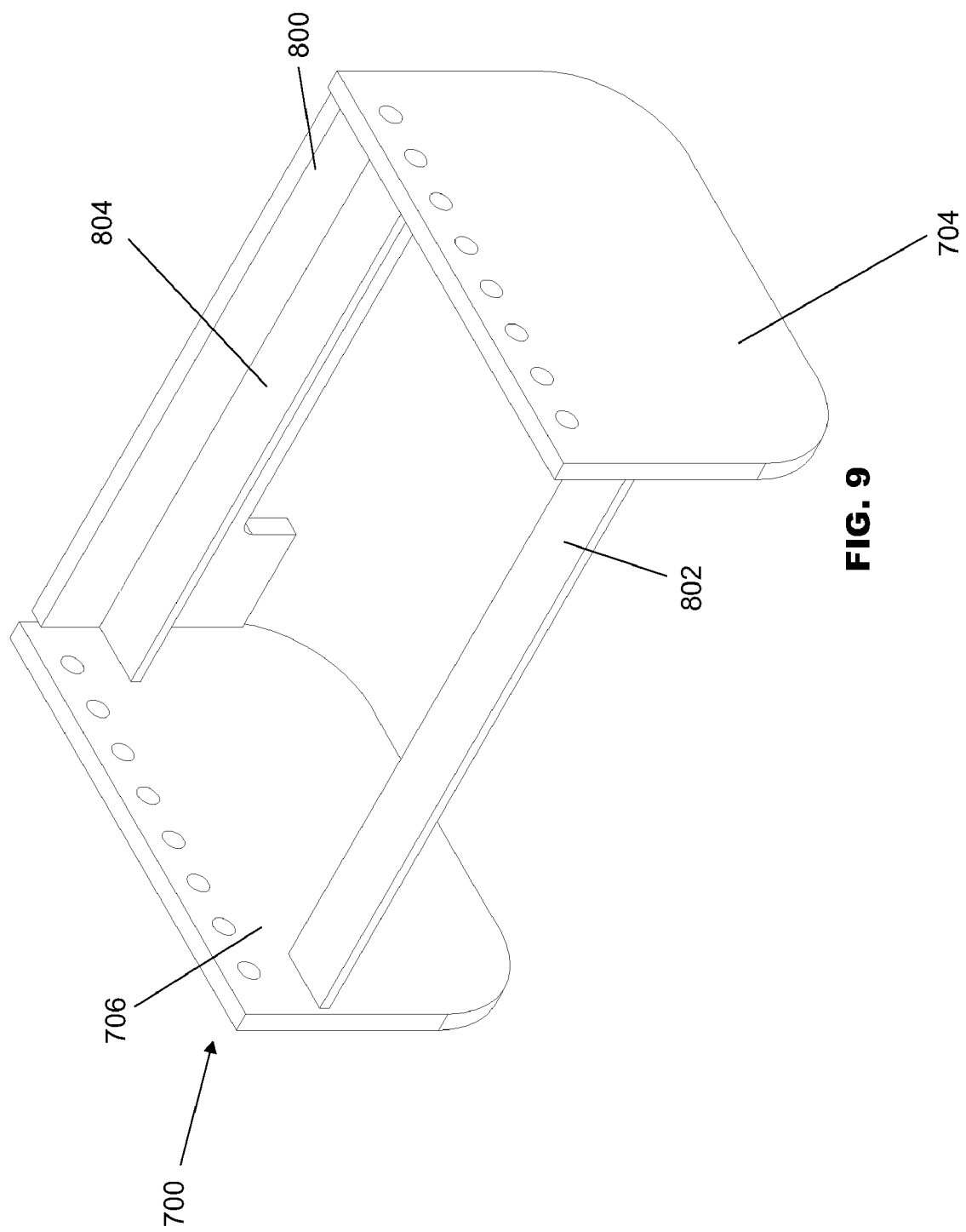
FIG. 9 is a perspective view of the exemplary interface apparatus shown in FIG. 7 detached from both the frame of the farm implement and the fifth wheel coupling device shown in FIG. 7.
Figure 10:
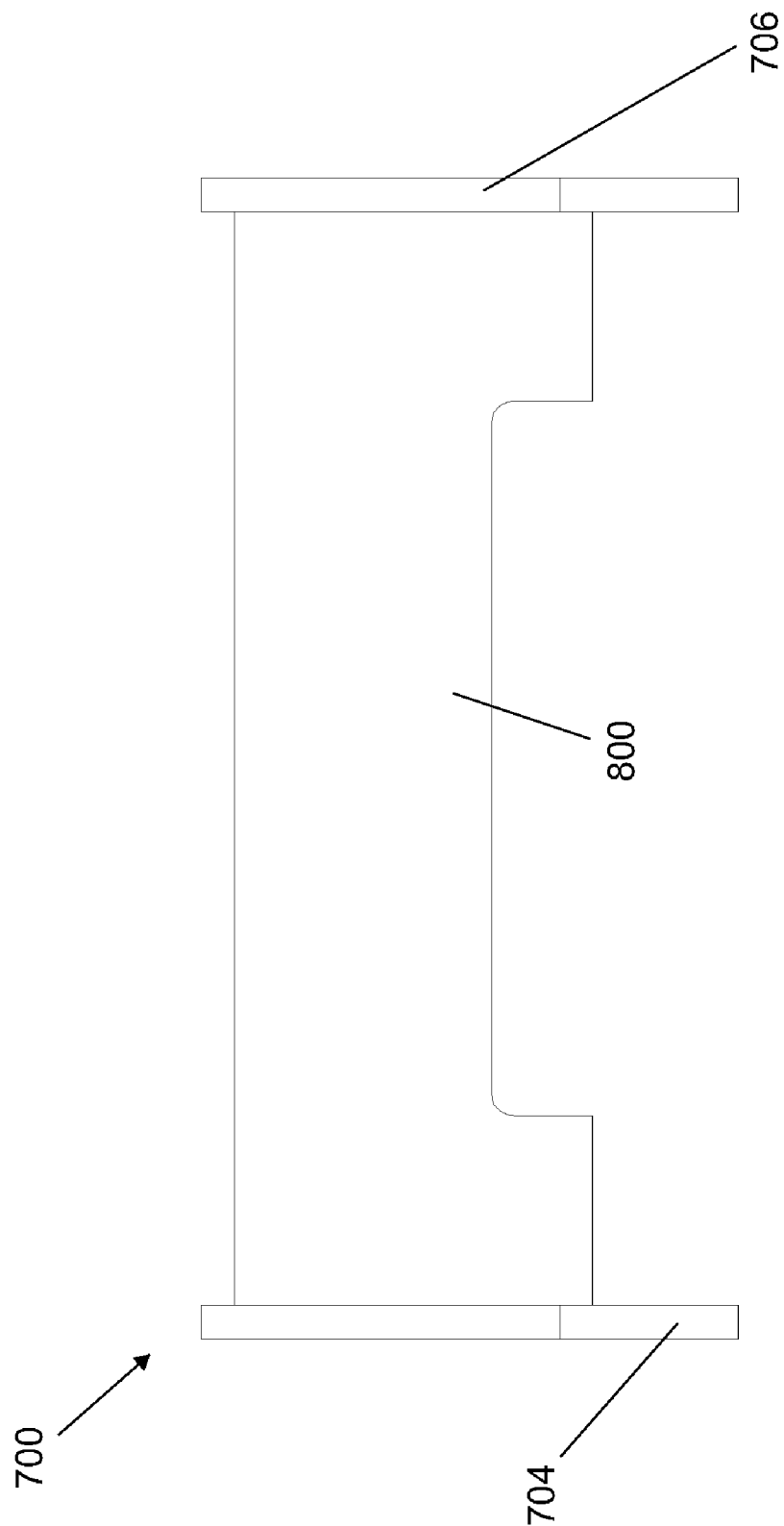
FIG. 10 is a rear view of the exemplary interface apparatus shown in FIG. 9 detached from both the frame of the farm implement and the fifth wheel coupling device shown in FIG. 7.

FIGS. 8-10 show an example of the interface between the chassis 702 and the fifth wheel coupling device 200 of farm implement 100 in further detail. FIG. 8 is a perspective view of the coupling device interface 700 interfacing with the fifth wheel coupling device 200, while detached from the chassis 702 of the farm implement 100. FIG. 9 is a perspective view of the coupling device interface 700 detached from both the chassis 702 of the farm implement 100 and the fifth wheel coupling device 200. FIG. 10 is a rear view of the exemplary interface apparatus detached from both the chassis 702 of the farm implement 100 and the fifth wheel coupling device 200.

In some embodiments, the coupling device interface 700 also includes a fifth wheel rest 800, a front fifth wheel rest stiffener 802 and a rear fifth wheel rest stiffener 804. The fifth wheel rest 800 is typically connected between the mounting plate 704 and the mounting plate 706 by welding, bolts, or in other ways. The front fifth wheel rest stiffener 802 and the rear fifth wheel rest stiffener 804 are typically connected between the mounting plate 704 and the mounting plate 706 by welding, bolts, or in other ways. In other embodiments, the mounting plate 704, the mounting plate 706, the fifth wheel rest 800, the front fifth wheel rest stiffener 802 and the rear fifth wheel rest stiffener 804 can be formed from one piece of material, such as a casted iron, steel, aluminum, titanium, or other strong and durable materials.

Figure 11:
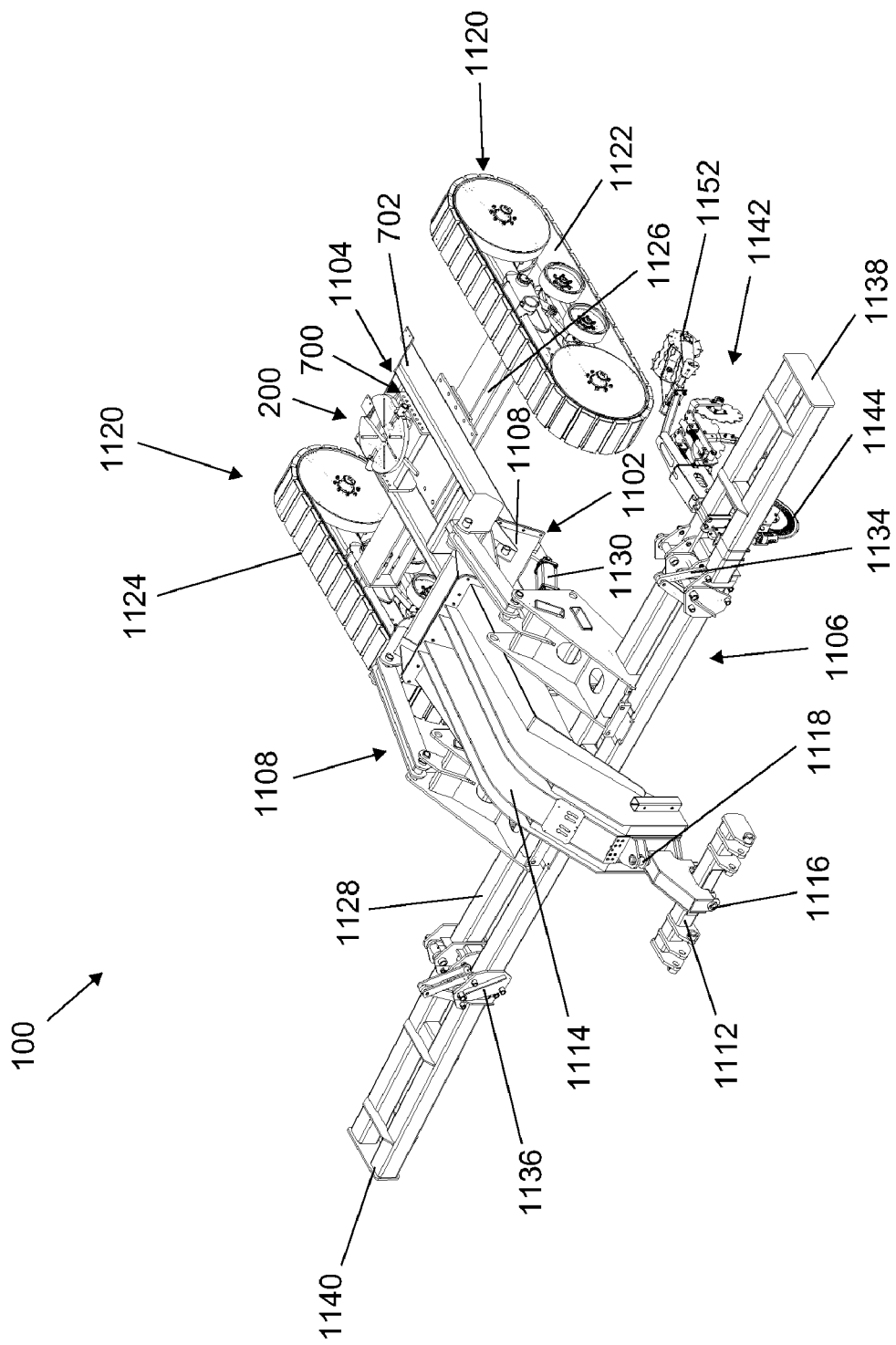
FIG. 11 is a perspective view of the farm implement shown in FIG. 1.
Figure 12:
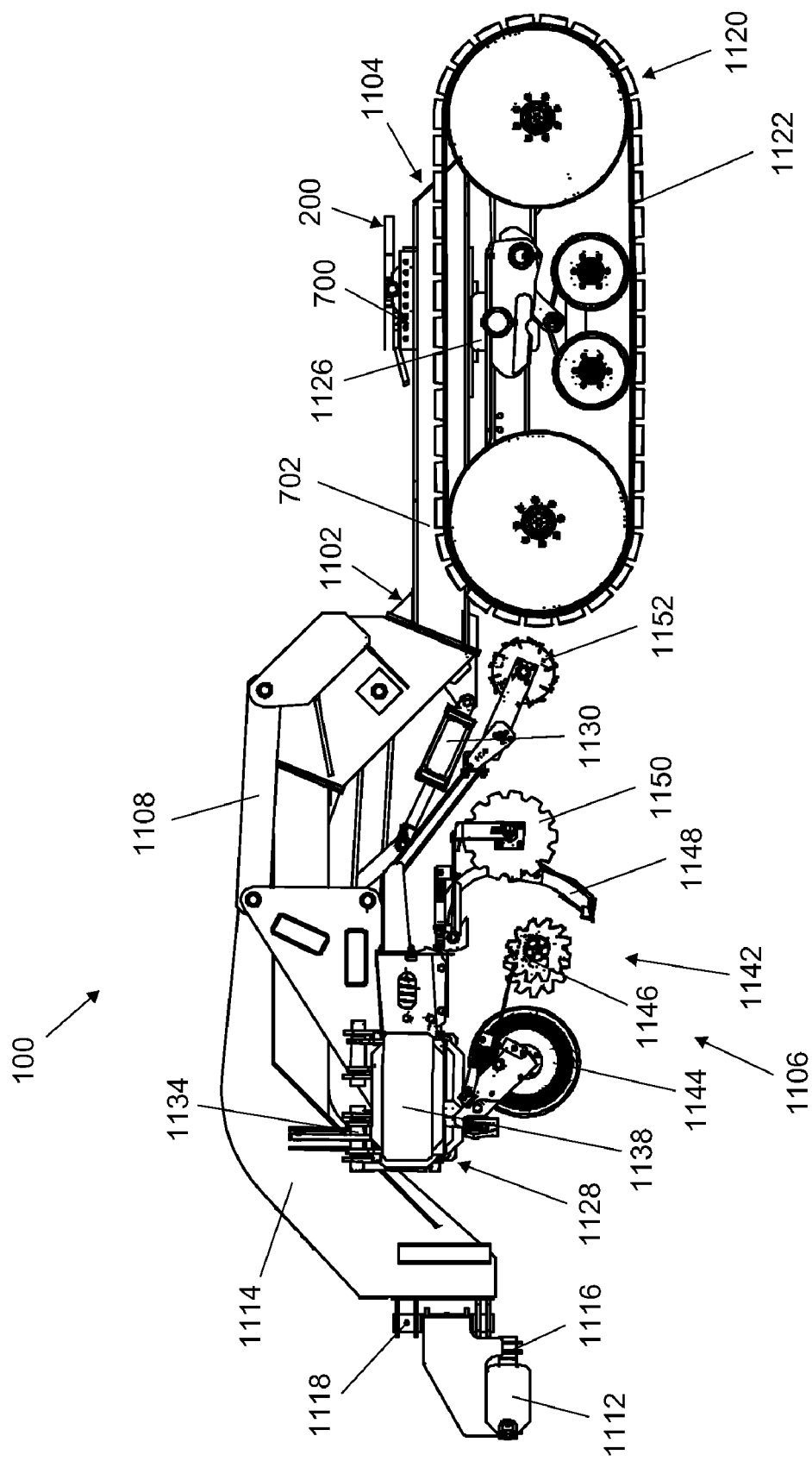
FIG. 12 is a side view of the farm implement shown in FIG. 1.
Figure 13:
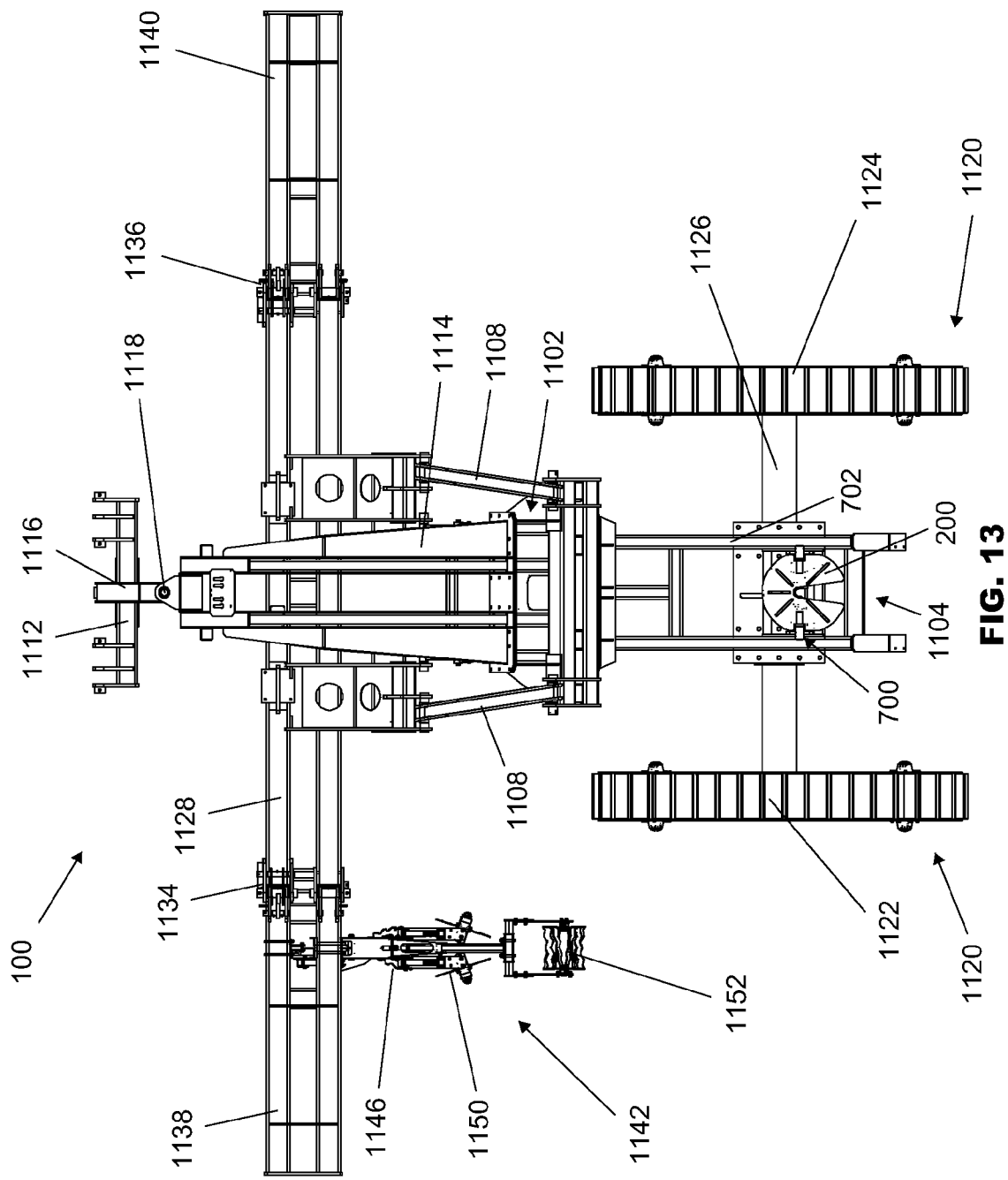
FIG. 13 is a top view of the farm implement shown in FIG. 1.

FIGS. 11-13 show an example of the farm implement 100 in further detail. FIG. 11 is a perspective view of the farm implement 100. FIG. 12 is a side view of the farm implement 100. FIG. 13 is a top view of the farm implement 100.

In example embodiments, the farm implement 100 includes the chassis 702 having a front end 1102 and a rear end 1104 opposite the front end 1102. The farm implement 100 also includes a tool section 1106 coupled to the chassis 702 by pivoting connection members 1108. The tool section 1106 is disposed near the front end of the farm implement 100. In other embodiments, the tool section 1106 is disposed at a different position. As discussed earlier, the farm implement 100 also includes the fifth wheel coupling device 200 coupled to the chassis 702 via the coupling device interface 700, near the rear end of the farm implement 100. In some embodiments, the fifth wheel coupling device 200 has all the components discussed above. Other embodiments include other coupling devices in lieu of, or in addition to those described.

In addition, some embodiments include a suitable coupling device 1112 disposed near the front end of farm implement 100 for connection to the tractor 104. In some embodiments, the coupling device 1112 is coupled to the chassis 702 via a curved arm 1114. In some embodiments, the coupling device 1112 is coupled to the curved arm 1114 by a pivoting mechanism 1116 and a pivoting mechanism 1118. The pivoting mechanism 1116 pivots each side up and down so as to minimize transference of any rocking motions due to rough terrain from the tractor 104 to the farm implement 100 and vice versa. The pivoting mechanism 1118 pivots left and right allowing the tractor 104 to turn and have the farm implement 100 follow. In some embodiments, the curved arm 1114 is curved such that it goes over the tool section 1106 while in both a raised and lowered position. In other embodiments, pivoting mechanisms couple the curved arm 1114 to the chassis 702 via pivots, allowing the arm to move up and down to compensate for variations in the terrain between the tractor 104 and the farm implement 100.

The farm implement 100 also includes a wheeled section 1120 connected to the chassis 702. The wheeled section 1120 interfaces between the chassis 702 of the farm implement 100 and the ground. In other embodiments, the farm implement 100 is used on other surfaces other than the ground. In some embodiments, the wheeled section 1120 includes a first continuous track 1122 is installed on a first side of the wheeled section 1120 and a second continuous track 1124 is installed on a second side of the wheeled section 1120 opposite the side with the first continuous track 1122. The wheeled section typically includes an axle 1126 coupling the first continuous track 1122 with the second continuous track 1124. The axle 1126 is also coupled with the chassis 702. In some embodiments, the wheeled section 1120 distributes weight across the first continuous track 1122 and the second continuous track 1124. In other embodiments, wheeled section 1120 does not include continuous tracks and only includes wheels or other suitable components. The primary criterion for the components of the wheeled section 1120 is that the components enable the farm implement 100 to move across the ground when towed behind the tractor 104.

In some embodiments, the coupling device interface 700 is positioned on the chassis 702 such that weight applied from the connection of semi-trailer 102 is distributed evenly over the axle 1126 and between the first continuous track 1122 and second continuous track 1124 of wheeled section 1120. Proper weight distribution helps keep farm implement 100 level, providing proper contact of the first continuous track 1122 and the second continuous track 1124 with the ground. Proper weight distribution also reduces strain on the chassis 702 and other components of farm implement 100.

In particular embodiments and as shown in FIGS. 11-13, the tool section 1106 of the farm implement 100 includes a tool bar 1128 that extends in a direction perpendicular to the direction the farm implement 100 moves while operational. The tool bar 1128 is raised from the ground and lowered closer to the ground by hydraulic cylinder 1130 and hydraulic cylinder 1132 (not visible). In other embodiments, other lifting mechanisms are used to facilitate raising and lowering of the tool bar. The tool bar 1128 is hinged at a first hinge 1134 and a second hinge 1136 such that a first exterior section 1138 and a second exterior section 1140 can be mechanically folded up toward the center of the farm implement. In some embodiments, hydraulic cylinders fold the first exterior section 1138 and the second exterior section 1140 toward the chassis 702 of the farm implement.

In some embodiments, the tool section 1106 of the farm implement 100 also includes a plurality of tool sets 1142 positioned on the tool bar 1128. For example, the tool section 1106 often includes 6 tool sets 1142, 8 tool sets 1142, or 24 tool sets 1142. In other embodiments, the tool section 1106 includes other amounts of tool sets. For clarity, only a single tool set from tool sets 1142 has been shown in the figures. In some embodiments, each of the tool sets 1142 include a coulter 1144, a residue manager 1146, a shank 1148, a disc sealer 1150 (or hiller), and a basket assembly 1152. In some embodiments, the coulter 1144 is a circular blade that slices into and separates the soil. In some embodiments, the coulter 1144 is between about 25 centimeters (about 10 inches) and about 76 centimeters (about 30 inches) in diameter, and preferably between about 43 centimeters (about 17 inches) and about 58 centimeters (about 23 inches) in diameter. In some embodiments, the outer edge of the coulter 1144 is fluted or wavy. In other embodiments, the outer edge of the coulter is smooth.

In some embodiments, the residue manager 1146 further separates the soil. In some embodiments, the residue manger 1146 includes two rotating circular blades that are angled such that the distance between the blades is narrower on the side nearest the coulter 1144 and tapers outward to be wider on the side nearer the shank 1148. In some embodiments, the shank 1148 rips and fractures the soil, creating a furrow in the soil. In some embodiments, the shank 1148 includes a blade that is between about 5.1 centimeters (about 2 inches) and about 25 centimeters (about 10 inches) in height, and preferably between about 13 centimeters (about 5 inches) and about 18 centimeters (about 7 inches) in height, and between about 0.95 centimeter (about 0.375 inches) and about 7.6 centimeters (about 3 inches) in thickness, and preferably between about 1.3 centimeters (about 0.5 inches) and about 5.1 centimeters (about 2 inches) in thickness. In some embodiments, the disc sealer 1150 gathers the soil from around the shank 1148 and reseals the furrow. In some embodiments, the disc sealer 1150 includes two rotating circular blades that are angled such that the distance between the blades is wider on the side nearest the shank 1148 and tapers to be narrower on the side nearer the basket assembly 1152.

In some embodiments, the basket assembly 1152 shapes and firms the strip. In some embodiments, the basket assembly 1152 is torsion mounted on a rubber mount. In some examples, the basket assembly 1152 has various pressure settings that are used to adjust the aggressiveness of firming done by the basket assembly 1152. In some examples, the basket assembly 1152 resists soil buildup because of its large size. In some examples, the basket assembly 1152 is between about 20 centimeters (about 8 inches) and about 51 centimeters (about 20 inches) in diameter and preferably between about 33 centimeters (about 13 inches) and about 38 centimeters (about 15 inches) in diameter. In some examples, the basket assembly 1152 includes concave tooth crossbars that crumble clods and firm soil. In other examples, the basket assembly 1152 includes other attributes useful for shaping and firming the soil. In other embodiments, other tools are included in the tool sets 1142.

Figure 14:
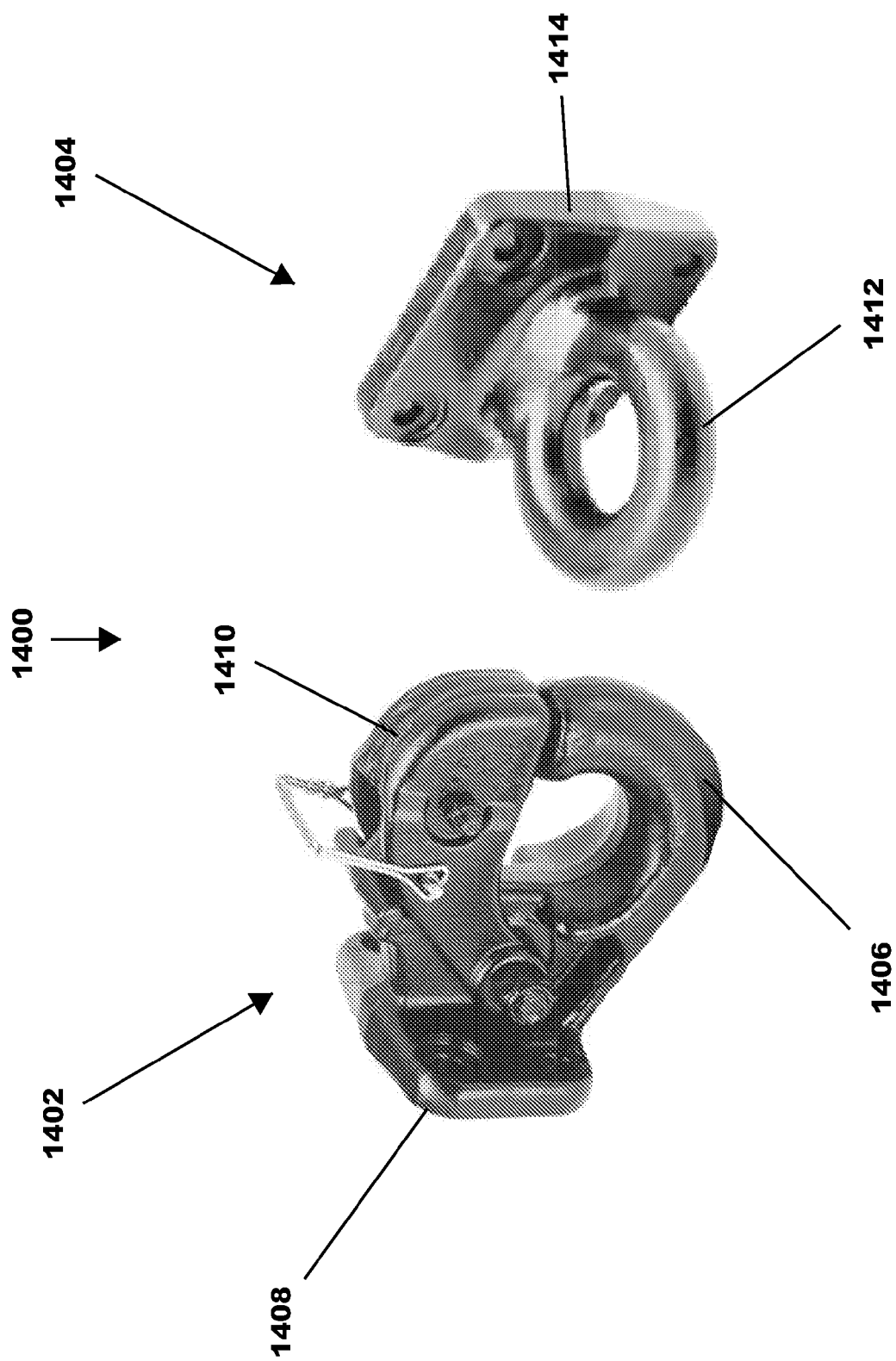
FIG. 14 is a perspective view of an alternative coupling device according to the present disclosure.

FIG. 14 is a perspective view of an alternative pintle type coupling system. As described earlier, possible embodiments include a pintle type coupling system 1400 for coupling with a full-trailer. The pintle type coupling system 1400 includes a pintle hook 1402 and a lunette ring 1404. The pintle hook 1402 is typically disposed on the farm implement 100, while the lunette ring 1404 is typically disposed on a full-trailer. The pintle hook typically includes a curved lower piece 1406 rigidly coupled with the farm implement 100 at a mount 1408. A curved upper piece 1410 is typically pivotably coupled with the curved lower piece 1406, such that it can be clamped down on the curved lower piece 1406. The pintle hook 1402 typically has a "C" shape when open and an "O" shape when closed. In some embodiments, the pintle hook 1402 is disposed near the rear end 1104 of the chassis 702 of farm implement 100. In other embodiments, the pintle hook 1402 is coupled with the coupling device interface 700 or the wheeled section 1120.

The lunette ring 1404 typically includes a toroid shaped piece 1412 connected to a full-trailer at a mount 1414. The toroid shaped piece 1412 is arranged and configured to couple with the curved lower piece 1406 of the pintle hook 1402.

Typically, once the toroid shaped piece 1412 is placed on and coupled with the curved lower piece 1406, the curved upper piece 1410 is clamped down, so it contacts the curved lower piece 1406 of the pintle hook 1402. Typically, the pintle hook 1402 also includes some sort of lock or other safety device that keeps the curved upper piece 1410 in contact with the curved lower piece 1406 of the pintle hook, thus coupling the pintle hook 1402 to the lunette ring 1404. In some examples, the pintle hook 1402 is arranged and configured to tow a full-trailer with a gross weight of over about 14,000 kilograms (about 30,000 pounds). In other examples, the pintle hook 1402 is arranged and configured to tow a full-trailer with a greater or lesser gross weight.

As described above, a full-trailer typically includes a semi-trailer 102 with an added dolly or turntable set of axles as a front support of the semi-trailer. Full-trailers are typically connected to trucks, tractors, trailers, and other vehicles that lack a fifth wheel coupling device 200 and instead have storage containers, tanks, or boxes disposed over the rear axles of the vehicle. Full-trailers are often connected to a semi-trailer 102 being towed by a truck-tractor for added capacity hauling. In some embodiments, a truck-tractor tows both a semi-trailer 102 and a full trailer to the location of the farm implement 100. The full-trailer is attached to the back of the semi-trailer 102 during travel to the location of the farm implement 100. Once at the location of the farm implement 100, either the semi-trailer 102 or the full-trailer can be coupled with farm implement 100. The semi-trailer 102 is coupled to the farm implement 100 by coupling the coupling pin 208 of the semi-trailer to the fifth wheel coupling device 200 of the farm implement 100. Alternatively, the full-trailer is coupled to the farm implement 100 by coupling the lunette ring 1404 to the pintle hook 1402 of the farm implement 100. In some embodiments, the farm implement 100 tows both the semi-trailer 102 and the full-trailer while coupled together.

In some embodiments, the farm implement also includes hoses connected between the plurality of tool sets 1142 positioned on the tool bar 1128 and the storage tank 202 positioned on top of the chassis 204 of the semi-trailer 102. The storage tank 202 typically has capacity to carry from about 20,820 liters (about 5,500 gallons) to about 34,069 liters (about 12,000 gallons) of substance. In other smaller embodiments, storage tank 202 has capacity to carry more than 3,800 liters (about 1,000 gallons) to about 11,000 liters (about 3,000 gallons). In yet other embodiments, storage tank 202 has capacity to carry more than about 3,800 liters (about 1,000 gallons). In yet another embodiment, storage tank 202 has a capacity to carry from about 11,000 liters (about 3000 gallons) to about 20,820 liters (5,500 gallons). In some embodiments, a hose transfers the substance to be applied from the storage tank 202 positioned on top of the chassis 204 of the semi-trailer 102 to the tool sets 1142 positioned on the tool bar 1128, where it is applied to soil or crops. In other examples, other devices are used to transfer the substance from the storage tank 202 positioned on top of the chassis 204 to the semi-trailer 102. As noted earlier, in some embodiments the application is a surface application and in other embodiments the application is a subsurface injection.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A farm implement comprising:
    a chassis;
    a wheeled section coupled to the chassis and arranged and configured to support the chassis with respect to a ground;
    a tool section coupled to the chassis and arranged and configured to introduce a substance to the ground; and
    a fifth wheel coupling device including a plate having a slot and a latching mechanism, wherein the latching mechanism is disposed below the plate and is arranged and configured to receive and engage with a coupling pin of a semi-trailer when the coupling pin is positioned within the slot, wherein the tool section is arranged and configured to receive the substance from the semi-trailer.

2. The farm implement of claim 1, further comprising a second hitching device positioned at a front end of the farm implement, wherein the second hitching device is arranged and configured to connect to a vehicle.

3. The farm implement of claim 1, further comprising a pintle hook coupled to a rear end of the chassis and arranged and configured to receive and couple with a complimentary lunette ring disposed on a second semi-trailer.

4. The farm implement of claim 1, wherein the wheeled section comprises:
    an axle coupled with the chassis, wherein the axle has a first side and a second side opposite the first side;
    a first wheel connected to the first side of the axle; and
    a second wheel connected to the second side of the axle.

5. The farm implement of claim 4, wherein the fifth wheel coupling device is positioned above the axle.

6. The farm implement of claim 4, wherein the wheeled section further comprises:
    a first continuous track coupled to the first wheel on the first side of the axle; and
    a second continuous track coupled to the second wheel on the second side of the axle.

7. The farm implement of claim 1, wherein:
    the tool section is positioned between the front end of the farm implement and the wheeled section; and
    the wheeled section is positioned between the tool section and a rear end of the farm implement.

8. The farm implement of claim 1, wherein the fifth wheel coupling device comprises a hydraulic cylinder facilitating ejection of the coupling pin from the fifth wheel coupling device.

9. The farm implement of claim 1, wherein the chassis includes a connection for placement of a storage container.

10. The farm implement of claim 1, wherein the tool section comprises:
    a tool bar; and
    at least one set of tools positioned on the tool bar.

11. The farm implement of claim 10, wherein the tool section comprises at least one lifting mechanism for raising and lowering the tool bar.

12. The farm implement of claim 11, wherein the at least one lifting mechanism comprises a hydraulic cylinder used to raise and lower the tool section.

13. The farm implement of claim 10, wherein the at least one set of tools comprises at least one of a soil slicer, a soil separator, a soil ripper, a soil combiner, and a soil shaper and firmer.

14. The farm implement of claim 10, wherein the farm implement is a subsurface substance injector.

15. The farm implement of claim 1, wherein the coupling pin has a first diameter in a base section near a chassis of the semi-trailer, a second diameter in a middle section and a third diameter in a tip section.

16. The farm implement of claim 15, wherein the second diameter is smaller than the first and the third diameters.

17. A farm implement comprising:
   a chassis;
   a wheeled section coupled to the chassis and arranged and configured to support the chassis with respect to a ground;
   a tool section coupled to the chassis and arranged and configured to introduce a substance to the ground; and
   a fifth wheel coupling device including a plate having a slot, the fifth wheel coupling device arranged and configured to connect with a coupling pin of a semi-trailer, the coupling pin having a first diameter in a base section near a chassis of the semi trailer, a second diameter in a middle section and a third diameter in a tip section, wherein the tool section is arranged and configured to receive the substance from the semi-trailer.

18. The farm implement of claim 17, wherein the second diameter is smaller than the first and the third diameters.

* * * * *